3,174,964
DERIVATIVES OF 6-AMINOPENICILLANIC ACID
Donald C. Hobbs, East Lyme, and Hsing T. Huang and Thomas A. Seto, Groton, Conn., assignors to Chas. Pfizer & Co., Inc., New York, N.Y., a corporation of Delaware
No Drawing. Filed Dec. 10, 1959, Ser. No. 858,612
5 Claims. (Cl. 260—239.1)

This invention relates to new antibiotic compounds and, more particularly, to new penicillin compounds.

This application is a continuation-in-part of our earlier filed copending U.S. application Serial Number 831,080, filed August 3, 1959, and now abandoned.

Penicillin, its homologous and analogous derivatives, all of which may be considered as substituted 6-aminopenicillanic acids in which an acyl group is present on the 6-amino group, can be prepared by several different methods. They can, for example, be synthesized by the method described by Sheehan et al., J. Am. Chem. Soc., 81, 2912 (1959), or biosynthetically by the growth of selected microorganisms under aerobic conditions in suitable nutrient media particularly in the presence of a relatively simple additive which stimulates penicillin production by acting as a side-chain precursor.

In addition, the utilization of 6-aminopenicillanic acid, the isolation of which from fermentation broths was recently reported by Batchelor et al., Nature, 183, 257 (1959), as an intermediate in the synthesis of penicillins via acylation with acyl chlorides or anhydrides permits the production of a great variety of penicillins as is described by Huang in United States patent application Serial Number 820,578, filed June 16, 1959, now abandoned, and by Belgian Patent 569,728, made available for inspection November 17, 1958.

All of these methods are, however, limited in scope generally because of the lack of available reactants, poor yields and subsequent high costs.

It has now been found possible to prepare a wide variety of penicillins by reacting 6-aminopenicillanic acid with an organic acid of the formula

wherein X is selected from the group consisting of oxygen and sulfur; Y is selected from the group consisting of hydroxyl and sulfhydryl; and R is selected from the group consisting of aryl, saturated and unsaturated alkyl, aralkyl, alicyclic, heterocyclic and substituted derivatives thereof using a carbodiimide, particularly 1,3-dicyclohexyl carbodiimide, as coupling agent. Other carbodiimides of especial value as coupling agents in this process are 1 - cyclohexyl - 3 - (4 - diethylaminocyclohexyl) carbodiimide, 1 - cyclohexyl - 3 - (2 - morpholinyl - (4)- ethyl) carbodiimide and their corresponding metho-p-toluenesulfonates.

The process is a general one for the production of penicillins and is especially valuable in those instances in which the use of an acyl chloride or anhydride is undesirable because of the presence of acid and base-sensitive groups or impossible due to unavailability of the acylating agent. By utilizing the valuable process of the instant invention, the free acid itself can be used, generally with production of better yields, shorter reaction periods and greater convenience than can otherwise be realized.

The salient features of this process are its simplicity, smoothness, rapidity, the substantial yields realized and the large number and variety of organic acids applicable.

It, therefore, permits the formation of new and heretofore unavailable penicillins and penicillins difficult or costly to obtain by previously known methods. This process by which a myriad variety of penicillins can be easily and readily produced is of immeasurable value to the pharmaceutical industry and the public welfare. It is of especial value as a preparatory method for a screening program involving, for example, the testing of new penicillins.

The process of this invention is carried out in general by coupling the appropriate organic acid, the acid component, with 6-aminopenicillanic acid, the amine containing component, in a suitable solvent system in the presence of a carbodiimide, such as, 1,3-dicyclohexyl carbodiimide. Although the order of addition of reagents is not critical it is preferred to add the carbodiimide as such or as a solution in the solvent of choice, preferably a water miscible organic solvent, to a solution of the acid component, generally in the same solvent or aqueous mixture thereof, and, to add to these reactants, a solution of 6-aminopenicillanic acid in dilute aqueous potassium or sodium bicarbonate or aqueous sodium bicarbonate-water miscible organic solvent. The use of 6-aminopenicillanic acid in suspension rather than in solution, while operative in the process of this invention, leads to slower reaction. In some instances it is first necessary to dissolve the acid component in water or dilute sodium or potassium bicarbonate prior to addition of the organic solvent in order to obtain a single phase system. Other alkaline reacting materials, such as, alkali metal hydroxides, alkali metal acetates and carbonates, ammonium hydroxide, ammonium acetate, bicarbonate and carbonate, alkaline earth hydroxides, acetates and carbonates, alkali metal amides and alkali metals can also be used but sodium and potassium bicarbonates are preferred because of their mild alkalinity.

As indicated above, wide latitude exists in the choice of the acid component. As a result of considerable experiment it has been discovered that organic acids of the type described broadly above combine readily with 6-aminopenicillanic acid in the process of this invention to produce penicillins of the formula

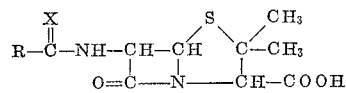

wherein R and X are as defined above. More specifically, the aliphatic radicals represented by R include straight-chain, branched-chain, saturated and unsaturated radicals, such radicals containing an interrupting group such as oxygen, sulfur, nitrogen, sulfonyl, as a member of the chain, and those containing one or more of the various substituent groups such as halogen, alkoxy, aryloxy, carbonyl, carboxyl, carboxamido, carboalkoxy, carboaryloxy, cyano, sulfo, phosphoro, nitro, amino, alkylamino, arylamino, acylamino, alkyl, acyloxy, acyl, hydroxy, mercapto, alkyl mercapto, arylmercapto, as well as aryl, heterocyclic and alicyclic and substituted derivatives thereof along the chain. The carbocyclic radicals, that is, the aryl, aralkyl, polycyclic and monocyclic alicyclic radicals, within the ambit of R include fully saturated and partially or completely unsaturated carbocyclic nuclei and substituted derivatives thereof; e.g., phenyl, naphthyl, phenanthryl, anthryl, styryl, cyclobutyl, 2-methylcyclopentyl, cyclohexyl, α-cyclohexylpropyl, benzyl, naphthylmethyl, decalyl, cyclopentanopolyhydrophenanthryl, and substituted derivatives thereof wherein the substituent or substituents is selected from the group consisting of hydroxy, alkoxy, aryloxy, thiol, thioalkyl, thioaryl, cyano, nitro, carbonyl, acyl, alkyl, aryl, amino, mono- and dialkyl amino, mono- and diaryl amino, carboxyl, carboxamido, mono- and dialkyl carboxamido, mono- and diaryl carboxamido, carboalkoxy, carboaryloxy, sulfonic, phosphoric, carboxhydrazido, and azo. The heterocyclic radicals within the scope of R likewise include the fully saturated and partially or completely unsaturated heterocyclic nuclei, that is, monocyclic and polycyclic or condensed heterocyclic radicals having a 5- or 6-membered ring containing at least one of the hetero atoms oxygen, sulfur, nitrogen, and substituted derivatives thereof. Such heterocyclic radicals include, for example, the monocyclic radicals pyrryl, pyridyl, pyrazinyl, pyrrolidyl, piperidyl, pyrimidinyl, oxazolyl, furyl, thienyl, α-pyranyl, γ-pyranyl, thiazolyl, imidazolyl; the condensed heterocyclic radicals benzofuryl, thionaphthyl, quinolyl, acridyl, isoquinolyl, indolyl, indazolyl, dihydrobenzofuryl, dibenzofuryl, benzimidazolyl, benzoxazolyl, and substituted derivatives thereof.

Every organic acid represented by the formula hereinabove has been satisfactory for coupling with 6-aminopenicillanic acid via the process of this invention to produce a penicillin. The utilization of acids bearing bulky groups which may be similar or dissimilar, such as phenyl, methyl and halogen, on the carbon adjacent to the acid group does not hinder this process.

It has been observed that those organic acids which contain primary amino groups react somewhat more slowly and less efficiently than do other acids due to the tendency of the amino group to enter into reaction. Alpha-amino acids in particular appear to react poorly in this process whereas the homologous and analogous amino acids in which the amino group is further removed from the carboxyl group react in a much more satisfactory manner. Substitution of the alpha amino group with an acyl, alkyl, aryl or heterocyclic radical greatly enhances the reaction. Therefore, when reacting α-amino acids via the process of this invention to produce α-aminomethyl penicillins, homologs and analogs thereof, it is preferred to first mask or protect the amino group by acylation with, for example, carbobenzoxy chloride, or acetic anhydride or by alkylation with trityl chloride. The carbobenzoxy group is of especial value since it can be easily removed to regenerate the free amino group.

In place of the acids represented by the above formula, there may be used equivalents of such acids. Such equivalents include the simple anhydrides and mixed anhydrides thereof which revert to the acid components under the conditions of reaction. Moreover, acyl chlorides also react via the process of this invention to produce penicillins since they readily hydrolyze to the acid in the aqueous solvent system employed. When using an acyl chloride as the source of the R moiety, it is advisable to employ a buffering agent, or neutralizing agent, to prevent decomposition of the carbodiimide by the hydrochloric acid generated and accelerate hydrolysis of the acyl chloride.

The molar ratio of reactants used depends upon the number of carboxylic acid groups present in the acid to which it is desired to couple 6-aminopenicillanic acid. In general, a range of carbodiimide:6-aminopenicillanic acid:acid component of from about $x:x:1$ to about $2x:x:1$, where $x$ represents the number of carboxylic acid groups to be coupled, is used. In the case of a monoprotic or a polyprotic acid in which only one acid group is to be reacted, the lower and upper limits are $1:1:1$ to $2:1:1$. For a polyprotic acid, for example, a diprotic acid in which both acid groups are to be coupled, the range is from about $2:2:1$ to about $4:2:1$. The upper limit of 2 moles of carbodiimide per mole of acid group to be reacted is dictated by economic reasons. The preferred molar range of reactants is from at least about $x:x:1$ to about $1.25x:x:1$. The use of a molar excess of the acid component in excess of 6-aminopenicillanic acid should be avoided since it tends to complicate the isolation and purification of the desired penicillin.

A variety of solvents can be used in the process of this invention. The primary requirement, of course, is that the solvent be inert under the conditions of use. As suitable solvents there may be mentioned dioxane, tetrahydrofuran, chloroform, ether, methylene chloride, acetonitrile and water and mixtures thereof. As a general rule, a water miscible organic solvent is preferred since, because of the poor solubility of 6-aminopenicillanic acid, and occasionally of the acid component, in organic solvents, an aqueous organic solvent system is most conveniently used. Two-phase systems comprising a solid and liquid phase or two liquid phases, while operative, lead to a much slower rate of reaction and generally to poorer yields of desired products.

The time factor is, of course, dependent upon many factors such as, the acid used, the temperature, the solvent system and the concentrations of reactants employed. However, reaction periods of from about 15 minutes to about four hours are generally adequate to produce satisfactory yields.

The reaction can be conducted over the temperature range of about 0° C. to the reflux temperature of the solvent used. It is preferred, however, to operate within the temperature range of about 20° C. to 70° C. since under these conditions, rapid reaction and satisfactory yields are generally readily obtained. The optimum reaction temperature for a given acid is best determined by experiment and, as is to be expected, is influenced to some extent by the solvent system and concentrations of reactants employed.

The reaction is best carried out at about a neutral pH. Although moderately acid to moderately alkaline pH values, that is, from about pH 5 to 8, are operative a pH of about neutral is favored since it minimizes the tendency of the carbodiimide toward decomposition, particularly in acid media, and of the 6-aminopenicillanic toward decomposition in alkaline media, particularly at pH values of about 9.

The choice of carbodiimide used is governed by several factors; namely, its stability, ease of preparation and availability, and the solubility characteristics of the co-product urea derivative produced as a result of reaction relative to those of the desired product. Although most of the carbodiimides known, Khorana, Chem. Revs., 53, 149 (1953), can be used in this process, 1,3-dicyclohexylcarbodiimide, 1-cyclohexyl-3-(2-morpholinyl)-(4)-(ethyl) carbodiimide, 1-cyclohexyl-3-(4-diethylaminocyclohexyl) carbodiimide are favored. 1,3-dicyclohexylcarbodiimide is generally preferred because of its availability and the low solubility of the co-product, 1,3-dicyclohexylurea, in most organic or aqueous solvents which permits easy separation. The remaining two carbodiimides each of which bears a tertiary amine substituent, and the corresponding metho-p-toluene sulfonates thereof, described by Sheehan et al., J. Org. Chem. 21, 439 (1956), are valuable in preparations wherein the solubility of the desired penicillin product is similar to that of the co-product 1,3-dicyclohexyl-urea. The basic nature of these carbodiimides permits extraction of the co-product ureas into dilute acid or water depending on whether the carbodiimides or their respective metho-p-toluene sulfonate quaternary salts are employed.

The desired penicillin products are recovered from the reaction mixture, following, if desired, destruction of the excess carbodiimide by the addition of a dilute acid, such as acetic acid, by filtration or extraction of the co-product ureas, and removal of the solvent. Alternatively, the penicillin product can often be extracted directly from the reaction mixture by means of a water immiscible organic solvent which is not a solvent for the co-product urea derivative. This procedure is of value in those cases wherein the penicillin product is insoluble and precipitates from the reaction mixture along with the co-product urea.

It is apparent from the examples given that many structurally different acids may be utilized in the process of this invention to produce penicillins of unusual, and heretofore unobtainable, structure, many of which exhibit activity against a wide variety of microorganisms. Many of these new penicillins possess specific and desired properties such as acid stability, water solubility, oral activity, resistance to penicillinase and improved activity against Gram-negative microorganisms.

In general, the dosage requirements for the new penicillins described herein are approximately of the same order of magnitude as those of the commercially available penicillins, for example, benzylpenicillin. The valuable compounds obtainable by the process of the present invention can be prepared for administration to humans or animals in conventional dosage forms such as pills, tablets, capsules, solutions, elixirs, or syrups for oral use, or in liquid forms for injectable products.

In addition, many of the penicillins thus produced serve as intermediates for the preparation of other valuable products. For example, N-carbobenzoxy derivatives of penicillins, obtained from 6-aminopenicillanic acid and N-carbobenzoxy amino acids by the process of this invention, may be converted to the corresponding amino derivatives via catalytic hydrogenation. Many of the new penicillins thus produced possess one or more asymmetric carbon atoms and are therefore capable of existing in optically active forms which can be isolated according to known procedures.

The following examples are provided to further illustrate in detail methods for the practice of the present invention. They are, however, not to be considered as limiting the invention in any way. Quantities of reactants are given in parts by weight.

In addition to the carbodiimide method illustrated, many compounds of this invention can also be prepared by reaction of 6-aminopenicillanic with the appropriate acyl halide, acyl anhydride, simple or mixed.

*Example I*

To a solution of 1 part (by weight) of phenylacetic acid in 65 parts of tetrahydrofuran there was added 1.5 parts of 1,3-dicyclohexylcarbodiimide in 30 parts of tetrahydrofuran and a solution of 1.58 parts of 6-aminopenicillanic acid in 14 parts of water:tetrahydrofuran (1:1) containing sufficient sodium bicarbonate to give a clear solution. A precipitate of 1,3-dicyclohexylurea formed immediately, but the reaction was allowed to proceed for 1 hour at 25° C.

A test sample of the reaction mixture was chromatographed on paper using the system toluene:acetone:calcium acetate, 2% solution (2:9:1). The remainder of the reaction mixture was diluted with water to precipitate 1,3-dicyclohexylurea and unreacted 1,3-dicyclohexylcarbodiimide which are removed by filtration. The filtrate is extracted with 50 ml. of ether, only the aqueous phase being maintained. The aqueous phase was then extracted with 3 x 10 ml. volumes of n-butanol at pH 2.0, the n-butanol phase separated and washed once with water. The n-butanol phase was then extracted with 2 x 10 ml. portions of water, sufficient sodium bicarbonate solution being added to each portion to produce an aqueous phase of pH 7.0. The combined aqueous extracts were washed with 20 ml. of ether and then freeze dried to give the benzylpenicillin sodium salt. The use of potassium bicarbonate produced the potassium salt. Neutralization with dilute hydrochloric acid gave benzylpenicillin.

In subsequent examples in which the procedure of Example I was followed, and in which products containing a basic group in the side chain, the R group of the generic formula above, were prepared, the isolation procedure was modified as follows.

The filtrate obtained following removal of 1,3-dicyclohexylurea and 1,3-dicyclohexylcarbodiimide was extracted with ether and the aqueous phase then freeze dried to give the crude product.

If desired, the products are purified by chromatography on silica in accordance with known procedures for purifying penicillins.

*Example II*

Following the procedure of Example I, but using 6-aminopenicillanic acid, the appropriate aliphatic acid and 1,3-dicyclohexylcarbodiimide in a 1:1:1.25 molar ratio, representative aliphatic penicillins listed below were produced:

| Acid | Penicillin |
|---|---|
| Acetic | Methyl. |
| Trimethylacetic | $\alpha,\alpha$-Dimethylethyl. |
| n-Octanoic | n-Heptyl. |
| Lauric | n-Undecyl. |
| Stearic | Heptadecyl. |
| Vinylacetic | 2-propenyl. |
| Acrylic | Vinyl. |
| Crotonic | 1-propenyl. |
| Undecylenic | 9-decenyl. |
| Hexen-2-oic | 1-pentenyl. |
| Brassidic | 12-heneicosenyl. |
| Oleic | 8-heptadecenyl. |
| Propiolic | Ethynyl. |
| 2-butynoic | 1-propynyl. |
| 2-octynoic | 1-heptynyl |
| $\Delta^{10,11}$-hendecynoic | $\Delta^{9,10}$-decynoic. |
| t-Butylacetic | $\beta,\beta$-Dimethylpropyl. |
| Allyldiphenylacetic | $\alpha,\alpha$-Diphenyl-3-butenyl. |
| Triphenylacetic | Triphenylmethyl. |
| Sorbic | 1,3-pentadienyl. |
| $\beta,\beta$-Pentamethyleneglutaric | $\beta,\beta$-Pentamethylene-$\gamma$-carboxypropyl. |
| $\gamma$-Phenylbutyric | $\gamma$-Phenylpropyl. |
| 1-naphthylacetic | 1-naphthylmethyl. |
| Hydrocinnamic | $\beta$-Phenylethyl. |
| $\beta$-(indole-3)-propionic | $\beta$-(indole-3)ethyl. |
| Trans-cinnamic | Trans-styryl. |
| 3-benzoylacrylic | $\beta$-Benzoylvinyl. |
| Thionaphthene-3-acetic | 3-thionaphthylmethyl. |
| Tropinic | N-methyl-2-carboxy-5-pyrrolidylmethyl. |
| 2-imino-3-benzothiazolineacetic | 2-imino-3-benzothiazolinemethyl. |
| DL-$\alpha$-methoxyphenylacetic | DL-$\alpha$-methoxybenzyl. |
| Cyclohexylacetic | Cyclohexylmethyl. |
| Actithiazic | $\omega$-(2-thiazolid-4-one)-n-pentyl. |
| $\gamma$-Cyclohexylbutyric | $\gamma$-Cyclohexylpropyl. |
| Phenylpropiolic | Phenylethynyl. |
| Indole acrylic | $\beta$-(3-indolyl)vinyl. |
| 4-hydroxy-2-iminothiazole-5-acetic | 5-(4-hydroxy-2-iminothiazole)-methyl. |
| 3-(2-furyl)acrylic | $\beta$-(2-furyl)vinyl. |
| o-(p-Chlorobenzoyl)benzoic | o-(p-Chlorobenzoyl)phenyl. |
| 2-nitro-4-acetaminobenzoic | 2-nitro-4-acetaminophenyl. |
| Desthiobiotin | 2-(4-methyl-5-imidazolidone-2-)-pentyl. |
| 3,5-dibromo-L-tyrosine | $\alpha$-Amino-$\beta$-(3,5-dibromo-4-hydroxyphenyl)ethyl. |
| 2-mercaptodihydrouracil-3-$\beta$-propionic | 2-mercaptodihydrouracil-3-$\beta$-ethyl. |
| 2-thiohydantoin-3-acetic | 2-thiohydantoin-3-methyl. |
| 3-coumaronylacetic | 3-coumaronylmethyl. |
| Penicilloic | $\alpha$-($\alpha$-Amino carboxymethyl)-5,5-dimethyl-4-thiazolylmethyl. |
| 2-amyloxazole-4-carboxylic | 2-amyl-4-oxazolyl. |
| 2,4-dihydroxythiazole-5-acetic | 5-(2,4-dihydroxythiazole)methyl. |
| $\alpha$-(Indole-3)-n-butyric | $\alpha$-(Indole-3)-n-propyl. |
| (Indole-3)-acetic | (Indole-3)methyl. |
| 3-hydroxy-indoleacetic | 3-hydroxy-indolemethyl. |
| Aminopterin | $\gamma$-carboxy-$\gamma$-(4-aminopteroyl). propyl and $\alpha$-carboxyethyl-$\alpha$-(4-amino-pteroyl)methyl. |
| $\gamma$-(1-pyrene)butyric | $\gamma$-(1-pyrene)propyl. |
| Trideconoic | Dodecyl. |
| $\beta,\beta$-Dimethylacrylic | $\beta,\beta$-Dimethylvinyl. |
| 4-phenylvaleric | $\gamma$-Phenylbutyl. |
| 5-phenylvaleric | $\omega$-Phenylbutyl. |
| Phenylundecanoic | Phenyldecyl. |
| Nonanoic | Octyl. |
| Docosanoic | Heneicosyl. |
| Erucic | Cis-12-heneicosenyl. |
| Decanoic | Nonyl. |
| 4-methyl-n-valeric | 3-methylbutyl. |
| $\alpha$-(2,4-dichlorophenoxy)propionic | $\alpha$-(2,4-dichlorophenoxy)ethyl. |
| 2-hydroxy-4-phenyl-3-butenoic | 1-hydroxy-3-phenyl-2-propenyl. |
| Ethoxyacetic | Ethoxymethyl. |
| 2,3,4,5,5-pentachloro-2,4-pentadienoic | Perchloro-1,3-butadienyl. |
| p-Chlorophenylmercaptoacetic | p-Chlorophenylmercaptomethyl. |
| 2-hydroxymethyl-4-pyrone-5-oxyacetic | 2-hydroxymethyl-4-pyrone-5-oxymethyl. |
| Trans-$\alpha,\beta$-dimethylacrylic | Trans-$\alpha,\beta$-dimethylvinyl. |
| Glycocholic | N-cholylaminomethyl. |
| o-Nitrophenylpropiolic | o-Nitrophenylethynyl. |
| Undecanoic | Decyl. |
| Methacrylic | $\alpha$-Methylvinyl |
| Ricinoleic | 11-hydroxy-8-heptadecenyl. |
| Piperic | 4-(3,4-methylenedioxyphenyl)-1,3-butadienyl. |
| o-Fluorocinnamic | o-Fluorostyryl. |
| 2,4-dichloro-5-methylphenoxyacetic | 2,4-dichloro-5-methylphenoxymethyl. |
| Thiodipropionic | 2-(2-carboxyethylmercapto)ethyl. |
| Trans-2,4-pentadienoic | Trans-1,3-butadienyl. |

| Acid | Penicillin |
| --- | --- |
| Benzylidenepyruvic | 1-keto-3-phenyl-2-propenyl. |
| α-Cyanocinnamic | α-Cyanostyryl. |
| Bis(4-carboxymethoxyphenyl) sulfone. | (4-carboxymethoxyphenyl)sulfonyl-phenoxymethyl. |
| Phenylthiohydantoic | Phenylthiocarbamidomethyl. |
| Phenylhydantoic | Phenylcarbamidomethyl. |
| 2-methyl-3-(β-acrylo)-quinoxaline-1,4-dioxide. | β-(1,4-dioxido-2-methyl-3-quinoxalyl)-vinyl. |
| Benzoyl-DL-methionine | α-Benzamido-γ-methylmercaptopropyl. |
| 3,3-bis(carboxymethylmercapto)-1-phenylpropane. | 1-(carboxymethylmercapto)-3-phenylpropylmercaptomethyl. |
| Vaccenic | Trans-10-heptadecenyl. |
| 3-trifluoromethylcrotonic | 2-trifluoromethyl-1-propenyl. |

*Example III*

Repetition of the procedure of Example I under the conditions given below produces the desired benzlypenicillin.

| Mole Ratio DCCI:APA:Acid* | T.,° C. | Solvent | Time, Hours |
| --- | --- | --- | --- |
| 1.25:1:1 | 20 | THF*-H₂O | 2 |
| 1.50:1:1 | 10 | THF-H₂O | 2 |
| 1.25:1:1 | 0 | THF-H₂O | 4 |
| 2:1:1 | 50 | THF-H₂O | 0.25 |
| 1.1:1:1 | 65 | THF-H₂O | 1 |
| 1:1:1 | 25 | Dioxane-H₂O | 1 |
| 1.25:1:1 | 100 | Dioxane-H₂O | 0.25 |
| 2:1:1 | 25 | Ether | 5 |
| 2:1:1 | 25 | Water | 4 |

*DCCI=1,3-dicyclohexylcarbodiimide; APA=6-aminopenicillanic acid; Acid=phenylacetic acid; THF=tetrahydrofuran.

In those preparations wherein an excess of 1,3-dicyclohexylcarbodiimide is used, dilute acetic acid may be added prior to filtration to decompose the excess carbodiimide.

*Example IV*

To 1 part of phenoxyacetic acid in 30 parts of dioxane there is added 2 parts of 1-cyclohexyl-3-(4-diethylaminocyclohexyl)carbodiimide, prepared as described by Sheehan et al., J. Org. Chem., 21, 439, (1956), followed by 1.45 parts of 6-aminopenicillanic acid in 100 parts of 1:1 dilute aqueous sodium bicarbonate-dioxane. After 5 hours at room temperature, the mixture is evaporated to dryness under reduced pressure. The residue is then taken up in ethylacetate and washed successively with dilute hydrochloric acid, water and then extracted into neutral buffer. It is then freeze dried and evaporated under reduced pressure to give the salt of phenoxymethylpenicillin.

*Example V*

The procedure of Example IV is repeated by using 1-cyclohexyl - 3 - (4 - diethylaminocyclohexyl)carbodiimide metho-p-toluenesulfonate as the coupling agent and acetonitrile as solvent in place of dioxane. Phenoxymethylpenicillin is obtained.

Repetition of this procedure but using 1-cyclohexy-3-(2-morpholinyl-(4)-ethyl)carbodiimide metho-p-toluenesulfonate as coupling agent yields the same product.

*Example VI*

Following the procedure of Example IV, octanoic acid is coupled to 6-aminopenicillanic acid using 1-cyclohexyl-3-(2-morpholinyl-(4)-ethyl)carbodiimide (Sheehan et al., J. Org. Chem., 21, 439 (1956)) as coupling agent to give n-heptylpenicillin.

*Example VII*

To 8 parts of cyclohexanecarboxylic acid in 700 parts of chloroform is added 16 parts of 1,3-dicyclohexylcarbodiimide followed by 13.5 parts of 6-aminopenicillanic acid in 500 parts of chloroform. The reaction is held at room temperature for about 20 hours then filtered and the filtrate evaporated to dryness to give cyclohexylpenicillin.

Repetition of this procedure at the reflux temperature of chloroform for 12 hours also gives cyclohexylpenicillin.

Replacement of the chloroform of this procedure with ether or methylene dichloride as solvent also produces cyclohexylpenicillin. However, the two phase systems resulting with chloroform, ether and methylene dichloride react slowly and give relatively low yields.

*Example VIII*

The procedure of Example V is repeated using acetic acid as the acid component and water as the solvent to give methylpenicillin. The 6-aminopenicillanic acid was used in aqueous suspension.

*Example IX*

A solution of 6-aminopenicillanic acid (4 parts) in 192 parts of water:tetrahydrofuran (1:1) containing 1 part sodium bicarbonate was added to dihydrocoumarilic acid (30 parts) and 1,3-dicyclohexylcarbodiimide (43 parts) in 65 parts of tetrahydrofuran. 1,3-dicyclohexyl urea precipitated within a few minutes. After two hours at room temperature the mixture was diluted to 2000 parts with water and 1 part of acetic acid added. The mixture was extracted with 35 parts of ether, the crystalline precipitate remaining suspended in the ether phase. The aqueous layer was separated, adjusted to pH 2.5 with N HCl, and extracted twice with 350 parts of n-butanol. The combined butanol extracts were extracted with 200 parts of water, which was discarded, and then twice with 250 parts of water, adjusting to pH 7 each time with 3% sodium bicarbonate. The combined aqueous extracts were then extracted with ether and freeze dried to give dihydro-α-benzofuranylpenicillin.

*Example X*

The following penicillins representative of those bearing an interrupting oxygen, sulfur, nitrogen or sulfonyl group in the R moiety were prepared according to the procedure of Example I.

| Acid | Penicillin |
| --- | --- |
| Ethylmercaptoacetic | Ethylmercaptomethyl. |
| 5,5'-thiodivaleric | 4-(4-carboxy-n-butylthio)-n-butyl. |
| Methoxyacetic | Methoxymethyl. |
| Acetylmercaptoacetic | Acetylmercaptomethyl. |
| Acetoxyacetic | Acetoxymethyl. |
| S-benzoylthioglycollic | S-benzoylthiomethyl. |
| N-methyl glycine | N-methylaminomethyl. |
| Acetyllactic | α-Acetoxyethyl. |
| Bis-(2-carboxyethyl)sulfone | 2-(2-carboxyethyl)sulfonylethyl. |
| Sulfonyldibutyric | 3-(3-carboxypropylsulfonyl)propyl. |
| 2-(2-hydroxybenzyl)phenoxyacetic | 2-(2-hydroxybenzyl)phenoxymethyl. |
| Phenylmercaptoacetic | Phenylmercaptomethyl. |
| p-Crotylphenoxyacetic | p-Crotylphenoxymethyl. |
| 2,4,5-trichlorophenoxyacetic | 2,4,5-trichlorophenoxymethyl. |
| 6-(2,4-dichlorophenoxy)hexanoic | 5-(2,4-dichlorophenoxy)pentyl. |
| 2-(2,4-di-tert-amylphenoxy)-n-butyric. | α-(2,4-di-tert-amylphenoxy)-n-propyl. |
| Methyliminodiacetic | N-methyl-N-carboxymethylaminomethyl. |
| 4-diphenyloxyacetic | 4-diphenyloxymethyl. |
| N-(2-imidazolinyl)glycine | N-(2-imidazolinyl)aminomethyl. |
| Acetylglycine | Acetaminomethyl. |
| Acetylmethionine | α-Acetamido-γ-methylmercaptopropyl. |
| o-Carboxamidophenoxyacetic | o-Carboxamidophenoxymethyl. |
| Methylsulfinylacetic | Methylsulfinylmethyl. |
| o-Phenylenedioxy acetic | o-Phenylenedioxymethyl. |
| α-Chloro-o-hydroxyphenoxyacetic | α-Chloro-o-hydroxyphenoxymethyl. |
| o-Chlorophenoxyacetic | o-Chlorophenoxymethyl. |
| p-Tert-butylphenoxyacetic | p-Tert-butylphenoxymethyl. |
| α-(p-Tert-butylphenoxy)propionic | α-(p-tert-butylphenoxy)ethyl. |
| 2,4-ditert-amylphenoxyacetic | 2,4-ditert-amylphenoxymethyl. |
| β-Carboxyethylbenzothiazyl-2-sulfide. | β-(2-benzothiazyl)mercaptoethyl. |
| 2,5-dihydroxybenzene-1,4-diacetic | 2,5-dihydroxy-4-carboxymethylbenzyl. |
| Allylphenoxyacetic | Allylphenoxymethyl. |
| p-Aminohippuric | N-(p-aminobenzamido)methyl. |
| m-(p-Tert-amylphenoxy)benzoic | m-(p-tert-amylphenoxy)phenyl. |
| p-n-Amoxybenzoic | p-n-Amoxyphenyl. |
| n-Benzoyl-α-alanine | α-(N-benzamido)-ethyl. |
| N-acetyl-α-aminobutyric | α-(N-acetamido)propyl. |
| β-(p-Phenoxybenzoyl)propionic | β-(p-Phenoxybenzoyl)ethyl. |

| Acid | Penicillin |
|---|---|
| o-Phenoxybenzoic | o-Phenoxyphenyl. |
| 4-chloro-2-methylphenoxyacetic | 4-chloro-2-methylphenoxymethyl. |
| p-Acetylphenoxyacetic | p-Acetylphenoxymethyl. |
| 2-2'-dithiodibenzoic | 2-(2'-carboxyphenyldithio)phenyl. |
| α-Chlorophenoxyacetic | α-Chlorophenoxymethyl. |
| m-Methylphenoxyacetic | m-Methylphenoxymethyl. |
| 2,5-dimethylphenoxyacetic | 2,5-dimethylphenoxymethyl. |
| 2,4'-methylenebisphenoxyacetic | 2-(4'-carboxymethoxybenzyl)-phenoxymethyl and 4-(2'-carboxymethoxybenzyl) phenoxymethyl. |
| 2,2'-methylenebisphenoxyacetic | 2-(2'-carboxymethoxybenzyl) phenoxymethyl. |
| 1,1'-bis-(2-naphthyloxy)acetic | 2-(2'-carboxymethoxy-1-naphthylmethyl)-naphthoxymethyl. |
| 2,3,5-trimethylphenoxyacetic | 2,3,5-trimethylphenoxymethyl. |
| 2,3-dimethylphenoxyacetic | 2,3-dimethylphenoxymethyl. |
| o-Toloxyacetic | o-Toloxymethyl. |
| 2,2'-methylenebis-(4-chloro-phenoxyacetic). | 2-(2'-carboxymethoxy-4-chloro-benzyl)4-chlorophenoxymethyl. |
| 2,4-dichloro-5-methylphenoxyacetic | 2,4-dichloro-5-methyl-phenoxymethyl. |
| 2,6-bis-(2,4,5-trichlorophenoxy) hexanoic. | 1,5-bis-(2,4,5-trichlorophenoxy) pentyl. |
| α-Bromophenoxyacetic | α-Bromophenoxy-methyl. |
| m-Phenylenedi(oxyacetic) | m-Carboxymethoxyphenoxymethyl. |
| (2-naphthyloxy)acetic | (2-naphthyloxy)methyl. |
| (4-methyl-1-naphthyloxy)acetic | (4-methyl-1-naphthyloxy)methyl. |
| 2-(2-hydroxybenzyl)phenoxyacetic | 2-(2-hydroxybenzyl)phenoxymethyl. |
| p-Mercaptophenylmercaptoacetic | p-Mercaptophenylmercaptomethyl. |
| 4,4'-dithiophenylmercaptoacetic | 4,4'-dithiophenylmercaptomethyl. |
| 2,4-dichlorophenoxybutyric | 2,4-dichlorophenoxypropyl. |
| 2-(2,4,5-trichlorophenoxy)propionic | α-(2,4,5-trichlorophenoxy)ethyl. |
| Thymoxyacetic | Thymoxymethyl. |
| Azobenzene-4-benzoic | Benzeneazophenyl. |
| α-(p-chlorophenoxy)isobutyric | α,α-Dimethyl-α-(p-chlorophenoxy) methyl. |
| 2,4,5-trichlorophenoxyacetic | 2,4,5-trichlorophenoxymethyl. |
| 2,4-bis(ethylmercapto)adipic | 1,3-bis(ethylmercapto)-4-carboxybutyl. |
| L-thiobutylsuccinic | α-(β)-Thiobutyl-β-carboxyethyl. |
| β-Allyloxypropionic | β-Allyloxyethyl. |

Example XI

Representative carbocyclic and heterocyclic penicillins prepared in accordance with Example I are listed below.

| Acid | Penicillin |
|---|---|
| Benzoic | Phenyl. |
| 1-naphthoic | 1-naphthyl. |
| 2-naphthoic | 2-naphthyl. |
| m-Toluic | m-Toluyl. |
| 1-nitroanthraquinone carboxylic | 1-nitro anthraquinonyl. |
| Anisic | p-Methoxyphenyl. |
| Cyclohexane carboxylic | Cyclohexyl. |
| Abietic | 1,12-dimethyl-7-isopropyl-1,2,3,4,-5,6,10,11,12,13-decahydrophenanthryl. |
| Anthracene-9-carboxylic | 9-anthryl. |
| Cyclopropanecarboxylic | Cyclopropyl. |
| 2-methylcyclopentanecarboxylic | 2-methylcyclopentyl. |
| Phenanthrene-9-carboxylic | 9-phenanthryl. |
| Decalin-2-carboxylic | 2-decalyl. |
| Cyclobutanecarboxylic | Cyclobutyl. |
| 1-hydroxy-2-naphthoic | 1-hydroxy-2-naphthyl. |
| p-Nitrobenzoic | p-Nitrophenyl. |
| 3,4,5-trimethoxybenzoic | 3,4,5-trimethoxyphenyl. |
| O-Phthalic | o-Carboxyphenyl. |
| 4-biphenylcarboxylic | 4-biphenyl. |
| m-Aminobenzoic | m-Aminophenyl. |
| m-Dimethylaminobenzoic | m-Dimethylaminophenyl. |
| 4-hydroxy-3,5-diiodobenzoic | 4-hydroxy-3,5-diiodophenyl. |
| o-(Benzylidenehydrazino)benzoic | o-(Benzylidenehydrazino)phenyl. |
| cis-4-cyclohexene-1,2-dicarboxylic | cis-2-carboxy-4-cyclohexenyl. |
| o-Acenaphthoylbenzoic | o-Acenaphthoylphenyl. |
| o-Carboxymethoxybenzoic | o-Carboxymethoxyphenyl. |
| Acetophenone-2-carboxylic | o-Acetylphenyl. |
| 4-cyanobenzoic | 4-cyanophenyl. |
| 2-carboxybenzylcyanide | 2-cyanotoluyl. |
| Dithiosalicylic | 6-(o-hydroxyphenylthiocarbamido) pencillanic acid. |
| 2-hydroxy-3-dibenzofurancarboxylic. | 2-hydroxy-3-dibenzofuryl. |
| 5-formylsalicylic acid | 2-hydroxy-5-formylphenyl. |
| 3,5-dimethylanthranilic | 2-amino-3,5-dimethylphenyl. |
| 4-chloro-1-hydroxy-2-naphthoic | 4-chloro-1-hydroxy-2-naphthyl. |
| o-Mercaptobenzoic | o-Mercaptophenyl. |
| Cholanic | γ-Methyl-γ-(17-pregnane)propyl. |
| Cholenic | γ-Methyl-γ-(17-(Δ⁵-pregnene) propyl. |
| Sulfosalicylic | 2-hydroxy-5-sulfophenyl. |
| o-Iodobenzoic | o-Iodosophenyl. |
| p-Acetamidobenzoic | p-Acetamidophenyl. |
| Piperonylic | 3,4-methylenedioxyphenyl. |
| L-proline | L-2-pyrrolidyl. |
| 2-picolinic | 2-pyridyl. |

| Acid | Penicillin |
|---|---|
| α-Furoic | α-Furyl. |
| 2-thiophenecarboxylic | 2-thienyl. |
| Quinaldic | α-Quinolyl. |
| Santhurenic | 4,8-dihydroxy-2-quinolyl. |
| Kynurenic | 4-hydroxy-2-quinolyl. |
| Pyrrole-2-carboxylic | 2-pyrryl. |
| Hydroxyproline | 4-hydroxy-2-pyrrolidinyl. |
| 3-aminopicolinic | 3-amino-2-pyridyl. |
| Indazole-3-carboxylic | 3-indazolyl. |
| Bicyclo(2.2.1)heptane carboxylic | Bicyclo(2.2.1)heptyl. |
| 1,2,3,4-tetrahydroacridine-5-carboxylic. | 1,2,3,4-tetrahydro-5-acridyl. |
| N-methyl-5-sulfoanthranilic | 2-(N-methylamino)-5-sulfophenyl. |
| Piperidine-2-carboxylic | 2-piperidyl. |
| 2,5-bis(carboxymethylmercapto)-1,3,4,-thiadiazine. | 2-(5-carboxymethylmercapto-1,3,4-thiadiazinyl)mercaptomethyl. |
| o-(p-Chlorobenzoyl)benzoic | o-(p-Chlorobenzoyl)phenyl. |
| Cholic | γ-(17β-etiocholane-3α,7α,12α-triol)-n-butyl. |
| p-Ethoxybenzoic | p-Ethoxyphenyl. |
| Isophthalic | m-Carboxyphenyl. |
| 2,4-dimethoxybenzoic | 2,4-dimethoxyphenyl. |
| 3,5-dihydroxybenzoic | 3,5-dihydroxyphenyl. |
| 3,5-dibromosalicylic | 2-hydroxy-3,5-dibromophenyl. |
| 2-nitro-4-chlorobenzoic | 2-nitro-4-chlorophenyl. |
| 2-chloro-4-nitrobenzoic | 2-chloro-4-nitrophenyl. |
| m-Chlorobenzoic | m-Chlorophenyl. |
| 2-bromo-3-nitrobenzoic | 2-bromo-3-nitrophenyl. |
| 2,3-dimethylbenzoic | 2,3-dimethylphenyl. |
| 2-chloro-5-nitrobenzoic | 2-chloro-5-nitrophenyl. |
| Nitroterephthalic | 2-(and 3-)nitro-4-carboxyphenyl. |
| 4-nitrophthalic | 1-(and 2)-carboxy-4-nitrophenyl. |
| Terephthalic | 4-carboxyphenyl. |
| Phthalamic | o-Carboxamidophenyl. |
| 5-bromo-2,4-dihydroxybenzoic | 5-bromo-2,4-dihydroxyphenyl. |
| 3,5-dichloro-4-hydroxybenzoic | 3,5-dichloro-4-hydroxyphenyl. |
| p-Benzoylbenzoic | p-Benzoylphenyl. |
| N-phenylanthranilic | o-(N-phenylamino)-phenyl. |
| p-Isopropylbenzoic | p-Isopropylphenyl. |
| 3-methoxy-2-nitrobenzoic | 3-methoxy-2-nitrophenyl. |
| 2,4-dihydroxybenzoic | 2,4-dihydroxyphenyl. |
| Chelidamic | 6-carboxy-4-pyridonyl. |
| 4-chloro-3-nitrobenzoic | 4-chloro-3-nitrophenyl. |
| 5-chlorosalicylic | 2-hydroxy-5-chlorophenyl. |
| 3,4-dinitrobenzoic | 3,4-dinitrophenyl. |
| m-Iodobenzoic | m-Iodophenyl. |
| p-Iodobenzoic | p-Iodophenyl. |
| m-Fluorobenzoic | m-Fluorophenyl. |
| 2-(4-ethylbenzoyl)-benzoic | 2-(4-ethylbenzoyl)phenyl. |
| 3,4-dimethoxybenzoic | 3,4-dimethoxyphenyl. |
| 3,5-dimethylanthranilic | 2-amino-3,5-dimethylphenyl. |
| 6-diethylcarbamoyl-3-cyclohexene-1-carboxylic. | 6-diethylcarbamoyl-3-cyclohexenyl. |
| Carbobenzoxy-L-proline | Carbobenzoxy-L-pyrrolidyl. |
| 3-β-hydroxy-bisnor-5-cholenic | α-17-(3-β-hydroxy-Δ⁵-pregnene)-ethyl. |
| 3-β-hydroxy-bisnor-cholenic | α-17-(3-β-hydroxypregnane)-ethyl. |
| Allo-hydroxy-proline | Allo-hydroxy-pyrrolidyl. |
| 5-carboxydehydroacetic | 2,3-dihydro-2-keto-3-acetyl-6-methyl-γ-pyronyl. |
| 6-methylpicolinic | 6-methyl-2-pyridyl. |
| 5-nitroquinaldic | 5-nitro-2-quinolyl. |
| 2-carboxy-1,3,4-triazole | 2-(1,3,4-triazolyl). |
| Indole-2-carboxylic | 2-indolyl. |
| Dihydroindole-2-carboxylic | 2-dihydroindolyl. |
| Isoxazole-5-carboxylic | 5-isoxazyl. |
| 3-methylisoxazole-5-carboxylic | 3-methyl-5-isoxazyl. |
| 4-methylthiazole-5-carboxylic | 4-methyl-5-thiazyl. |
| o-Carbomethoxybenzoic | o-Carbomethoxyphenyl. |
| Glycyrrhetinic | 20-(11-keto-oleanolyl). |
| Eburicoic | 1-17-(3-hydroxy-4,4,14-trimethyl-Δ⁸(9)-pregnene)-4-isopropylpentene-4. |
| 2-aminonicotinoic | 2-amino-3-pyridyl. |
| Coumarilic | 2-benzofuryl. |
| Dihydrocoumarilic | α-dihydrobenzofuryl. |
| Chelidonic | 2-(4-oxo-6-carboxy-1,4-pyranyl). |
| Coumarin-3-carboxylic | 3-(2-oxo-1,2-benzopyranyl). |
| Coumalic | 5-(2-oxo-1,2H-benzopyranyl). |
| Dipicolinic | 6-(6¹-carboxy-2,2¹-dipyridyl). |
| p-(n-N-dichlorosulfamyl) benzoic | p-(n-N-dichlorosulfamyl) phenyl. |
| 2-amino-3-naphthoic | 2-amino-3-naphthyl. |
| Bromoterephthalic | 2-(and 3)-bromo-4-carboxyphenyl. |
| Picolinic acid-N-oxide | N-oxide-2-pyridyl. |
| 2,6-pyridine dicarboxylic | 6-(2)-carboxy-2-(6)-pyridyl. |
| Pyrazole-3,5-dicarboxylic | 3(5)-carboxy-5(3)-pyridyl. |
| 2,3-pyrazinedicarboxylic | 3-carboxy-2-pyrazinyl. |
| 7-chloro-4-hydroxy-3-quinoline-carboxylic. | 7-chloro-4-hydroxy-3-quinolyl. |
| γ-Pyrone-2,6-dicarboxylic | 2(6)-carboxy-6(2)-γ-pyronyl. |
| Cinchoninic | 4-quinolyl. |
| Quinoline-8-carboxylic | 8-quinolyl. |
| 5-nitro-2-furoic | 5-nitro-2-furyl. |
| 4,5-imidazoledicarboxylic | 4-(5)carboxy-5-(4)imidazolyl. |
| 3-aminothionaphthene-2-carboxylic. | 3-aminothionaphthyl. |
| Thionaphthene-3-carboxylic | 3-thionaphthyl. |
| Orotic | 1,2,3,6-tetrahydro-2,6-dioxo-4-pyrimidinyl. |
| Thioorotic | 1,2,3,6-tetrahydro-2-oxo-6-thiono-4-pyrimidinyl. |
| p-Toluic | p-Toluyl. |
| 2,5-dinitrobenzoic | 2,5-dinitrophenyl. |
| Cyclohexanepropionic | Cyclohexylethyl. |
| 2-chloro-6-mercaptoisonicotinic | 2-chloro-6-mercapto-4-pyridyl. |

| Acid | Penicillin |
|---|---|
| 4-methyl-4-cyclohexene-1,2-dicarboxylic. | 2-carboxy-4-(5)-methylcyclohexenyl. |
| 9-xanthenecarboxylic | 9-xanthyl. |
| 3,5-dinitrobenzoic | 3,5-dinitrophenyl. |
| 2-chloro-6-methoxyisonicotinic | 2-chloro-6-methoxy-4-pyridly. |
| 2-nitro-m-toluic | 2-nitro-m-toluyl. |
| 4-fluoro-3-nitrobenzoic | 4-fluoro-3-nitrophenyl. |
| 2-ethoxyisonicotinic | 2-ethoxy-4-pyridyl. |
| 2-chloro-6-cyclohexyloxyisonicotinic. | 2-chloro-6-cyclohexyloxy-4-pyridyl. |
| 2-methyl-3-amino-6-chloropyridine 4,5-dicarboxylic. | 2-methyl-3-amino-6-chloro-4(5)-carboxy-5-(4)-pyridyl. |
| DL-pyroglutamic | 5(2-pyrrolidonyl). |
| 3,5-dinitro-p-toluic | 3,5-dinitro-p-toluyl. |
| 2-ethyl-4-methylpentanoic | α-Ethyl-γ-methyl-n-butyl. |
| α,α-Dimethyl-n-valeric | α,α-Dimethyl-n-butyl. |
| 3,4,5-triiodobenzoic | 3,4,5-triiodophenyl. |
| 6-methyl-2-picolinic | 6-methyl-2-pyridyl. |
| 2-phenylquinoline-4-carboxylic | 2-phenyl-4-quinolyl. |
| 2,4,6-trinitrobenzoic | 2,4,6-trinitrophenyl. |
| bis(2-carboxy-1-methyl-3-indolyl)-methane. | 1-methyl-3-(1-methyl-2-carboxy-3-indolylmethyl)-2-indolyl. |
| 7-nitroindole-2-carboxylic | 7-nitro-2-indolyl. |
| 3,5-dimethyl-4-cyclohexene-1,2-dicarboxylic. | 2-carboxy-3,5-dimethyl-4-cyclohexenyl. |
| 2-n-butoxyisonicotinic | 2-n-butoxy-4-pyridyl. |
| 3-methylanthranilic | 2-amino-3-methylphenyl. |
| 2,6-dichloroisonicotinic | 2,6-dichloro-4-pyridyl. |
| 5-chloro-2-furoic | 5-chloro-2-furyl. |
| 2-chloro-6-diethylaminoisonicotinic. | 2-chloro-6-diethylamino-4-pyridyl. |
| 2-amino-6-hydroxyisonicotinic | 2-amino-6-hydroxy-4-pyridyl. |
| 2-chloro-5-amino-6-indolylcinchomeronic. | 2-chloro-3(or 4) carboxy-5-amino-6-indolyl-4(or 3) pyridyl. |
| 2,3-dimethylquinoxaline-6-carboxylic. | 2,3-dimethyl-6-quinoxalyl. |
| 3-bromo-4-keto-1,2,3,4-tetrahydronaphthoic. | 3-bromo-4-keto-1,2,3,4-tetrahydro-1-naphthyl. |
| m-Acetamidobenzoic | m-Acetamidophenyl. |
| 2-nitroisophthalic | 2-nitro-3-carboxy-phenyl. |
| N-formylanthranilic | o-(N-formylamino)phenyl. |
| 2,6-dimethoxyisonicotinic | 2,6-dimethoxy-4-pyridyl. |
| 2,6-dimethoxyisonicotinicethyl-3-carboxy-2-hydroxy-6-methyl-5-nitrosoisonicotinate. | 2,6-dimethoxy-4-pyridyl-2-hydroxy-4-carbethoxy-5-nitroso-6-methyl-3-pyridyl. |
| Cyclobutane-1,1-dicarboxylic | 1-carboxycyclobutyl. |
| Homophthalic | o-Carboxybenzyl. |
| 2-butyloxy-6-chloroisonicotinic | 2-butyloxy-6-chloro-4-pyridyl. |
| m-Trifluoromethylbenzoic | m-Trifluoromethylphenyl. |
| 4-hydroxy-quinoline-2-carboxylic | 4-hydroxy-2-quinolyl. |
| 1,2,3,4-tetrahydro-acridine-5-carboxylic. | 1,2,3,4-tetrahydro-5-acridyl. |

*Example XII*

The following penicillins, representative of the great variety of substituted aliphatic penicillins synthesized, were produced by the procedure of Example I.

| Acid | Penicillin |
|---|---|
| Iodoacetic | Iodomethyl. |
| Fluoroacetic | Fluoromethyl. |
| β-Iodopropionic | β-Iodoethyl. |
| α-Bromo-n-butyric | α-Bromo-n-propyl. |
| α-Bromopelargonic | 1-bromooctyl. |
| 12-bromopalmitic | 11-bromopentadecylic. |
| 2,3-dichloroacrylic | α,β-Dichlorovinyl. |
| Trichloroacetic | Trichloromethyl. |
| 2,3-dichloro-2-methylpropionic | α,β-Dichloro-α-methylethyl. |
| α,β-Dibromosuccinic | α,β-Dibromo-β-carboxy-ethyl. |
| 9,10,12,13-tetrabromostearic | 8,9,11,12-tetrabromohexadecyl. |
| Perfluoroglutaric | ω-Carboxy-perfluoropropyl. |
| Phenylpyruvic | α-Keto-β-phenylethyl. |
| Dihydroxytartaric | α,β-Diketo-β-carboxypropyl. |
| Ketomalonic, sodium salt | Oxalyl, sodium salt. |
| α-Ketobutyric | α-Keto-propyl. |
| α-Ketoglutaric | α-Keto-γ-carboxypropyl. |
| Mesitylacetic | 3-keto-5-methyl-4-hexenyl. |
| Glyoxylic | Formyl. |
| Malonaldehyde | Formylmethyl. |
| Succinaldehyde | ω-Formylethyl. |
| Glutaraldehyde | ω-Formylpropyl. |
| DL-α-amino-n-butyric | DL-α-amino-n-propyl. |
| α-Aminopropionic | α-Aminoethyl. |
| Margaric | Hexadecyl. |
| 2-ethylhexanoic | α-Ethylpentyl. |
| 12-hydroxystearic | 11-hydroxyheptadecyl. |
| α-Keto-o-nitrophenylpropionic | α-Keto-o-nitrophenylethyl. |
| Levulinic | 3-keto-n-butyl. |
| Malonic | Carboxymethyl. |
| Azelaic | ω-Carboxy-n-heptyl. |
| Monopotassium acetylenedicarboxylic | β-Carboxy-ethynyl-potassium salt. |
| Methylhydrogen malonate | Carbomethoxymethyl. |
| Methylhydrogen azelate | ω-Carbomethoxy-n-heptyl. |
| Methylhydrogen-3-methyl adipate | ω-Carbomethoxy-β-methylbutyl. |
| Monoamide of succinic | β-Carboxamido ethyl. |
| Monomethylamide of adipic | ω-(N-methylcarboxamido)-n-butyl. |
| 1,2,3,4-butanetetracarboxylic | 2,3,4-tricarboxybutyl. |
| Benzylmalonic | α-Carboxy-β-phenylethyl. |
| Itaconic | 2-carboxy-2-propenyl. |
| N,N-bis(β-cyanoethyl)-β-carboxyacrylamido | β-(N,N-bis-(β-cyanoethyl)carboxamido)-vinyl. |
| Phenylhydrogen succinate | ω-Carbophenoxyethyl. |
| 1,12-dodecane dicarboxylic | ω-Carboxydodecyl. |
| Fumaric | β-Carboxyvinyl. |
| N-butylmaleamic | β-(N-butylcarboxamido)vinyl. |
| Cyanoacetic | Cyanomethyl. |
| 6-cyanocaproic | 5-cyanopentyl. |
| o-Carboxyphenylacetonitrile | o-Cyanomethylphenyl. |
| α-Sulfpropionic | α-Sulfaethyl. |
| β,β-Disulfopropionic | β,β-Disulfoethyl. |
| α-Sulfo-β,β-dimethylacrylic | α-Sulfo-β,β-dimethylvinyl. |
| α-Phosphonopropionic | α-Phosphonoethyl. |
| α-Phosphono-n-octanoic | α-Phosphono-n-heptyl. |
| o-Phosphonobenzoic | o-Phosphonophenyl. |
| 4-nitropentanoic | 3-nitro-n-butyl. |
| Nitromalonic | α-Nitro-β-carboxymethyl. |
| 3-methyl-4-nitrobutanoic | 2-methyl-3-nitropropyl. |
| α-Aminoisovaleric | α-Amino-β-methylpropyl. |
| Benzoylglycine | Benzamidomethyl. |
| Benzoylphenylalanine | α-Benzamido-β-phenylethyl. |
| N-acetyl-N-phenylglycine | N-acetyl-N-phenylaminomethyl. |
| Carbobenzoxy-L-tryptophan | 1-α-carbobenzoxamido-β-indolylethyl. |
| Nitrilotriacetic | bis(carboxymethyl)iminomethyl. |
| DL-2-aminohexanoic | DL-α-amino-n-pentyl. |
| Aspartic | α-(and β) amino-α-carboxyethyl. |
| Mandelic | α-hydroxybenzyl. |
| 3-indolelactic | α-hydroxy-β-(3-indolyl)ethyl. |
| Glycolic | Hydroxymethyl. |
| β-Hydroxybutyric | β-Hydroxypropyl. |
| Gluconic | 1,2,3,4,5-pentahydroxy-n-pentyl. |
| β,β,β-Trimethyllactic | α-Hydroxy-β,β-dimethylpropyl. |
| Malonic acid hydrazide | Carbohydrazidomethyl. |
| Acetylmandelic | α-Acetoxybenzyl. |
| N,N-dibutylmaleamic | β-(N,N-dibutyl carboxamido)vinyl. |
| N-phenyl maleamic | β-(N-phenylcarboxamido)vinyl. |
| N-methyl maleamic | β-(N-methylcarboxamido)vinyl. |
| N,N-dimethyl maleamic | β-(N,N-dimethylcarboxamido)vinyl. |
| 3,4-dihydro-2,5-dimethyl-2-pyranyl methyl maleamic. | β-(N-(3,4-dihydro-2,5-dimethyl-2-pyranylmethyl)carboxamido)vinyl. |
| N-acetyl-3,5-diiodo-tyrosine | α-acetamido-β-3,5-diiodo-4-hydroxy-phenyl ethyl. |
| β-Chlorobutyric | β-Chloropropyl. |
| Dihydroxytartaric acid-osazone sodium salt. | Osazone of α,β-diketo-β-carboxyethyl. |
| 3-(p-hydroxyphenyl)-2-phenylpropionic. | β-(-p-hydroxyphenyl)-α-phenylethyl. |
| β-(p-methoxybenzoyl)propionic | β-(p-methoxybenzoyl)ethyl. |
| β-Hydroxybutyric | β-Hydroxypropyl. |
| β-Mercaptopropionic | β-Mercaptoethyl. |
| α-Phenylcinnamic | α,β-Diphenylvinyl. |
| Carbobenzoxy-DL-serine | α-Carbobenzoxamido-β-hydroxyethyl. |
| α,β-Dibromopropionic | α,β-Dibromoethyl. |
| Linoleic | Heptadecadienyl. |
| Suberic | ω-Carboxyhexyl. |
| 1,11-undecanedicarboxylic | ω-Carboxynonyl. |
| α-Methoxy-β-Methylcinnamic | α-Methoxy-β-Methylstyryl. |
| α-Methylcinnamic | α-Methylstyryl. |
| Phenylsuccinic | α-(and β)-phenyl-β-carboxyethyl. |
| 2-naphthylacetic | 2-naphthylmethyl. |
| o-Nitrocinnamic | o-Nitrostyryl. |
| o-Hydroxycinnamic | o-Hydroxystyryl. |
| β-Isothioureidopropionic | β-Isothioureidoethyl. |
| β-Dithiocarbamylpropionic | β-Dithiocarbamylethyl. |
| m-Nitrocinnamic | m-Nitrostyryl. |
| 3,5-Diiodotyrosine | α-Amino-β-3,5-diiodo-4-hydroxyphenyl ethyl. |
| 2,3-dimethoxycinnamic | 2,3-dimethoxystyryl. |
| 3-methoxy-4-hydroxycinnamic | 3-methoxy-4-hydroxystyryl. |
| 3-methylglutaric | β-Methyl-γ-carboxypropyl. |
| 5-nitro-3-indoleacetic | 5-nitro-3-indolylmethyl. |
| 7-nitro-3-indoleacetic | 7-nitro-3-indolylmethyl. |
| α-(3-indolyl)-propionic | α-(3-indolyl)ethyl. |
| 4-(and 6)-nitro-3-indoleacetic | 4-(and 6)-nitro-3-indolylmethyl. |
| 2,2-dimethylglutaric | α,α-(and γ,γ)-dimethyl-γ-carboxypropyl. |
| 2,3-decenoic | α,β-nonenyl. |
| 2,3-dodecenoic | α,β-undecenyl. |
| Aleuritic | 8,9,15-trihydroxypentadecyl. |
| β-(2,5-dimethyloxazolyl-4)-propionic. | β-(2,5-dimethyloxazolyl-4)-ethyl. |
| β-(4-methylthiazolyl-5-)-alanine | α-Amino-β-(4-methyl-thiazolyl-5)-ethyl. |
| 2-bromohexanoic | 1-bromopentyl. |
| 2, 4-dichlorophenoxyacetic | 2, 4-dichlorophenoxymethyl. |
| N-(2-ethylhexyl)maleamic | β-(N-2-ethylhexylcarboxamido)vinyl. |
| α-Bromoheptanoic | α-Bromohexyl. |
| 2-mercaptodihydrouracil-3-β-4-propionic. | 2-mercaptodihydrouracil-3-β-4-ethyl. |
| β-Benzoylpyruvic | 3-phenyl-1, 3-diketopropyl. |
| o-Nitrophenylacetic | o-Nitrobenzyl. |
| β-(Diphenylamino)propionic | β-(Diphenylamino)ethyl. |
| 4-methyl-2-nitrophenylpyruvic | α-Keto-β(4-methyl-2-nitrophenyl) ethyl. |
| α-Carboxyethyl-N-phenylcarbamate | α-phenyl-carbamyl oxyethyl. |
| DL-α-methyl-n-butyric | DL-α-methylpropyl. |
| Cyclohexanecaproic | Cyclohexanepentyl. |
| p-Formamido-mercaptophenylacetic | p-Formamido-mercaptobenzyl. |

| Acid | Penicillin |
|---|---|
| β,β-Diphenyl-isobutyric | α-Methyl-β,β-diphenylethyl. |
| Cyclopentapropionic | Cyclopentaethyl. |
| p-Methoxybenzylidenepyruvic | 1-keto-3-(p-methoxyphenyl)-2-propenyl. |
| 2,7-dibromosebacic | α,ω-dibromo-ω-carboxyoctyl. |
| 4,4-bis(p-hydroxyphenyl)pentanoic | 3,3-bis(p-hydroxyphenyl)butyl. |
| β-Benzoylpropionic | β-Benzoylethyl. |
| 9,10-dihydroxystearic | 8,9-dihydroxyheptadecyl. |
| p-hydroxyphenylacetic | p-hydroxybenzyl. |
| 6-methylindoleacetic | 6-methylindolylmethyl. |
| 1,2,3,4-tetrahydronaphthalene-acetic | 1,2,3,4-tetrahydronaphthyl-methyl. |
| Carboxymethylmercapto-5-phenyl-1,3,4-oxadiazole | 5-phenyl-1,3,4-oxadiazolyl-2-mercaptomethyl. |
| α-Bromo-isobutyric | α-Bromo-isopropyl. |
| m-cresoxyacetic | m-Cresoxymethyl. |
| α-Bromolauric | α-Bromoundecyl. |
| α-Bromoisocaproic | α-Bromo-α-methylbutyl. |
| β-Bromobutyric | β-Bromopropyl. |
| ω-Bromocaproic | ω-bromopentyl. |
| Trifluoroacetic | trifluoromethyl. |
| Cyclopentanecarboxylic | cyclopentyl. |
| Decamethylenedicarboxylic | ω-Carboxydodecyl. |
| 2,6-dibromocaproic | 1,5-dibromopentyl. |
| Cyclopentanepropionic | cyclopentylethyl. |
| 3,4-dimethoxyphenylacetic | 3,4-dimethoxybenzyl. |
| 2-ethylisohexanoic | α-Methyl-α-ethylpentyl. |
| p-Nitrocinnamic | p-Nitrostyryl. |
| di-n-propylmalonic | α-Carboxy-α-propyl-n-butyl. |
| Homoveratric | 3,4-dimethoxybenzyl. |
| α-Iodopropionic | α-Iodoethyl. |
| Benzoylglycylglycine | benzoylglycylaminomethyl. |
| α-Bromodiethylacetic | α-Bromo-α-ethylpropyl. |
| L-α-chloroisocaproic | L-α-chloro-α-methylbutyl. |
| Trans-cyclopentane-1,2-dicarboxylic | trans-2-carboxycyclopentyl. |
| Diethylacetic | 3-pentyl. |
| p-Chloroacetamidomethyl-phenylacetic | p-Chloroacetamidomethylbenzyl. |
| Formyl-DL-aminobutyric | DL-α-formamidopropyl. |
| β-Ketoglutaric | β-Keto-γ-carboxypropyl. |
| γ-Ketopimelic | γ-Keto-ω-carboxyhexyl. |
| α-Hydroxy-n-butyric | 2-hydroxy-propyl. |
| β-Ketoadipic | β(or γ)-Keto-ω-carboxybutyl. |
| DL-α-phenylhydracrylic | α-Hydroxymethylbenzyl. |
| α-Ketoenanthic | α-Ketohexyl. |
| β-Phenyl-β-hydroxypropionic | β-Phenyl-β-hydroxyethyl. |
| β-Methyl-β-ethylglutaric | β-Methyl-β-ethyl-γ-carboxypropyl. |
| DL-n-propylmalonic | α-Carboxy-n-butyl. |
| α-Benzylhydrocinnamic | Dibenzylmethyl. |
| 2,4-dioxo-5-thiazolidineacetic | 2,4-dioxo-5-thiazolylmethyl. |
| β-Hydroxypropionic | β-Hydroxyethyl. |
| o-Toluic | o-Toluyl. |
| N-formylalanine | N-formylaminoethyl. |
| Diacetyl tartaric acid methyl ester | α,β-Diacetyl-β-carbomethoxyethyl. |
| β-Hydroxyphenylpyruvic | α-Keto-β-hydroxyphenylethyl. |
| Acenaphthenesuccinic | α-Acenaphthyhl-β-carboxyethyl. |
| α-Ketopimelic acid phenyl hydrazone | Phenyl hydrazone of α-keto-ω-carboxy-pentyl. |
| 2,4-dicarbomethoxy-3,5-dihydroxyphenylacetic | 2,4-dicarbomethoxy-3,5-dihydroxybenzyl. |
| 6-(N,N-dimethyldithiocarbamyl)hexanoic | 5-(N,N-dimethyldithiocarbamyl)pentyl. |
| 3-(1-keto-3,5,5-trimethyl-2-cyclohexene-2-yl)propionic | 2-(1-keto-3,5,5-trimethyl-2-cyclohexene-2-yl)-ethyl. |
| α-Bromodiphenylacetic | α-Bromobenzylhydryl. |
| α-phenyl-n-butyric | α-phenylpropyl. |
| Thiomalic | α-(β)-Thio-β-carboxyethyl. |
| α-(1-hydroxy-1-cyclopentyl)phenylacetic | α-(1-hydroxy-1-cyclopentyl)benzyl. |
| C-14 alkenylsuccinic | α-(and β)-C14-alkenyl-β-carboxyethyl. |
| α-butylcyclohexaneacetic | α-cyclohexylpentyl. |
| 3-(5-nitro-2-furfurylideneamino)-L-hydantoin acetic | 2,4-diketo-3-(5-nitro-2-furfurylideneamino)-L-imidazolylmethyl. |
| 2-methoxyphenylacetic | 2-methoxybenzyl. |
| β-(5-acenaphthoyl)propionic | β-(5-acenaphthoyl)ethyl. |
| Epoxysuccinic | α,β-epoxy-β-carboxyethyl. |
| 9-fluorenesuccinic | α-(9-fluorenyl)-β-carboxyethyl. |
| 7-hydroxy-3-methyl-1-oxo-2-indacanacetic | 7-hydroxy-3-methyl-1-oxo-2-indacanmethyl. |
| o-Hydroxyphenyl-phenylacetic | α-(o-Hydroxyphenyl)benzyl. |
| 2-isonitrosohexanoic | α-Isonitrosopentyl. |
| N-chloroacetyl-L-tryptophan | α-(N-chloracetamido)-β-(3-indolyl)ethyl. |
| Indole-3-(α-carboxypropionic) | α-carboxy-β(3-indolyl). |
| 2,4-dinitrophenylhydrazone of α-oxoglutaric | 2,4-dinitrophenylhydrazone of α-keto-β-carboxyethyl. |
| 1,4-bis(2-carboxyethyl)piperazine HCl | β-(4-carboxyethyl-1-piperazyl)ethyl. |
| Benzoyl-DL-glutamic | α-(γ)-benzamido-γ-carboxypropyl. |
| α-Phenylpropionic | α-Methylbenzyl. |
| α-Bromovaleric | α-Bromobutyl. |
| 2,3-dibromo-triphenylpropionic | α,β-Dibromotriphenylethyl. |
| β-Carboxyethylbenzothiazyl-2-sulfide | β-(2-benzothiazyl)mercaptoethyl. |
| 2,4-dihydroxythiazole-5-acetic | 5-(2,4-dihydroxythiazole)methyl. |
| Oxanilic | α-Keto-α-anilinomethyl. |
| Thioctic | 5,7-dithiohexyl. |
| 5-thio-6-methylheptanoic | 4-thio-5-methylhexyl. |
| Carbobenzoxy-DL-alanine | α-Carbobenzoxamidoethyl. |
| Carbobenzoxy-DL-phenylalanine | α-Carbobenzoxamido-β-phenylethyl. |

| Acid | Penicillin |
|---|---|
| Carbobenzoxy-L-tyrosine | α-Carbobenzoxamido-β-(p-hydroxyphenyl)ethyl. |
| Carbobenzoxy-DL-valine | α-Carbobenzoxamido-β-methylpropyl. |
| Methylhydrogen succinate | ω-Carbomethoxyethyl. |
| Methyl hydrogen glutarate | ω-Carbomethoxypropyl. |
| N-benzyl aspartic | α-(and β)-N-benzylamino-β-carboxyethyl. |
| Bromostearic | Bromoheptadecyl. |
| β-(3-amino-2,4,6-triiodo-phenyl)-α-ethylpropionic | β-(3-amino-2,4,6-triiodo-phenyl)-α-ethyl ethyl. |
| α-Bromomyristic | α-Bromotridecyl. |
| 11-bromoundecanoic | 10-bromodecyl. |
| ω-Cyanopelargonic | ω-Cyanooctyl. |
| ω-Benzoylvaleric | ω-Benzoyl-butyl. |
| p-Bromomandelic | α-Hydroxy-p-bromobenzyl. |
| cis-β-Chlorocrotonic | 2-chloro-1-propenyl. |
| 1,2-diaminocyclohexane tetraacetic | α-N-(2-bis(carboxymethyl)-amino)cyclohexylamino-methyl. |
| β-Bromopropionic | β-Bromoethyl. |
| α-Bromoisovaleric | α-Bromo-β-methylpropyl. |
| p-Chloromandelic | α-Hydroxy-p-chlorobenzyl. |
| Carbobenzoxy-aspartic | α-(and β)-carbobenzoxamido-β-carboxyethyl. |
| 5-Thioheptadecanoic | 4-thiohexadecyl. |
| Thioglycollic | Thiomethyl. |
| β-Mercaptovaleric | β-Mercaptobutyl. |

*Example XIII*

The procedure of Example II was repeated using the following anhydrides as acid source. In each case, the mole ratio of anhydride:6-aminopenicillanic acid:dicyclohexylcarbodiimide was 1:2:2.

| Anhydride | Penicillin |
|---|---|
| Acetic | Methyl. |
| Acetic propionic | Methyl and ethyl. |
| Trifluoroacetic | Trifluoromethyl. |
| n-Caproic | n-Pentyl. |
| Phenylacetic | Benzyl. |
| Benzoic | Phenyl. |
| α-Naphthoic | α-Naphthyl. |
| p-Chlorobenzoic | p-Chlorophenyl. |
| Furoic | α-Furyl. |
| m-Nitrobenzoic | m-Nitrophenyl. |
| o-Methoxybenzoic | o-Methoxyphenyl. |
| Nicotinic | 3-pyridyl. |
| 4-methyl-2-propylvaleric anhydride. | α-Propyl-γ-methylbutyl. |

*Example XIV*

The following penicillins were prepared from the respective anhydride according to the procedure of Example II but using a mole ratio of anhydride:6-aminopenicillanic acid:dicyclohexylcarbodiimide of 1:1:1.

| Anhydride | Penicillin |
|---|---|
| t-Butoxyformic 4-keto-6-nitro caproic | 3-keto-5-nitropentyl. |
| Succinic | β-Carboxyethyl. |
| Maleic | β-Carboxyvinyl. |
| α,β-Dimethylsuccinic | α,β-Dimethyl-β-Carboxyethyl. |
| Cis-cyclohexanedicarboxylic | Cis-2-carboxcyclohexyl. |
| 1,2,3,6-tetrahydrophthalic | 2-carboxy-4-cyclohexenyl. |
| Phthalic | o-Carboxyphenyl. |
| Diphenic | 2-(2'-carboxyphenyl)-phenyl. |
| 3(and 4) chlorophthalic | 2-carboxy-3(and 4)-chlorophenyl. |
| 1-n-octenyl succinic | α-n-Octenyl-β-carboxyethyl. |
| 3,6-endoxo-1,2,3,6-tetrahydrophthalic | 2-carboxy-3,6-endoxo-4-cyclohexenyl. |
| α-Phenylgutaric | Phenyl-γ-carboxypropyl. |
| C4-alkenylsuccinic | α-(and β)-C4-alkenyl-β-carboxyethyl. |
| C7-alkenylsuccinic | α-(and β)-C7-alkenyl-β-carboxyethyl. |
| C8-alkenylsuccinic | α-(and β)-C8-alkenyl-β-carboxyethyl. |
| C17-alkenylsuccinic | α-(and β)-C17-alkenyl-β-carboxyethyl. |
| Isatoic | o-Carbamylphenyl and o-carboxyanilino. |

Incidentally, all of the above exemplified compounds were found to possess activity against *Staphylococcus aureus* 5, *Escherichia coli* 21, *Salmonella typhosa*, Mycobacterium 607 and the penicillinase producing, benzyl penicillin resistant strain of *Staphylococcus aureus* 376.

Example XV

The procedure of Example I was repeated but in the absence of sodium bicarbonate and using as solvent the following: tetrahydrofuran, acetonitrile, dioxane. The reaction mixtures were held at room temperature for about 20 hours at the end of which time the reaction mixtures were worked up in the same manner.

| Acid | Penicillin |
|---|---|
| Thioacetic | Methyl. |
| Thioheptanoic | Heptylcarb. |
| Dithiobenzoic | 6-(phenylthioamido)penicillanic acid. |
| Dithiosalicylic | 6-(o-hydroxyphenylthiocarbamido) penicillanic acid. |
| Glyoxylic | Formyl. |
| p-Phenylazobenzoic | p-Phenylazophenyl. |
| p-Azoxybenzoic | p-Azoxyphenyl. |
| 3,5-diamino-2-(4'-(sulfamyl-phenyl)azo)benzoic. | 3,5-diamino-2-(4'-(sulfamylphenyl)azo)phenyl. |

Example XVI

Following the procedure of Example IX, the following organic acids were reacted to produce the penicillins listed:

| Acid | Penicillin |
|---|---|
| Benzoylecgonine | 3-benzoyloxy-2-tropyl. |
| Camphoric | 1,2,2-trimethyl-3-carboxycyclopentyl. |
| 3β-hydroxy-Δ⁵-etiocholenic | 17-(3β-hydroxy-Δ⁵-pregnene). |
| β,β-Disulfopropionic | β,β-Disulfoethyl. |
| α-Sulfo-β,β-dimethylacrylic | α-Sulfo-β,β-dimethylvinyl. |
| α-Phosphonopropionic | α-Phosphonoethyl. |
| α-Phosphono-n-octanoic | α-Phosphono-n-heptyl. |
| o-Phosphonobenzoic | o-Phosphonophenyl. |

Example XVII

Additional penicillins were prepared according to the procedure of Example IX to give penicillins wherein the R group was derived from the following acids:

| | |
|---|---|
| Acetyltannic | Hydronopic. |
| Polygalacturonic | Ethylenebisdithiocarbamylpropionic. |
| 2-(p-chlorophenylthiocarboxy) imidazoline. | 2-(phenylthiocarboxy)imidazoline. |
| Hedragonic | 6-(phenylacetyl)-aminopenicillanic. |
| Dibromocinnamic | 3-methylene-1-oxo-2-isoindoline acetic. |
| Diphenolic | 2,2'-methylene-bis-(4-chlorophenoxy-2-furoic). |
| Thioparaconic | N-methylsuccinanilic. |
| Succinanilic | α-n-Butylmalonanilic. |
| 1-methylsuccinic anhydride | Dithiodiglycolic. |
| Bis(mercaptoacetic acid) thione | Acetyl thioitamalic. |
| Thioitamalic | Sodium-N,N-dimethyldithiocarbamylhexanoate. |
| Phenylhydroxymethylhydantoic | Dehydrocholic acid trithiosemicarbazone. |
| Thiodibromodipropionic | Lycanic. |
| Citronellic | Isanic. |

Example XVIII

To a well stirred solution of 1 part (by weight) of 6-aminopenicillanic acid in 45 parts of 3% aqueous sodium bicarbonate and 24 parts of acetone there is added a solution of 1.1 part of p-nitrophenylsulfonyl chloride in 10 parts of dry acetone over a 10 minute period. Following completion of addition, the mixture is agitated at room temperature for one-half hour. It is then extracted with ether (45 parts in 3 portions) and only the aqueous phase retained. The aqueous solution is next acidified to pH 2.0 with hydrochloric acid and extracted with 10 parts of n-butanol. This step is repeated twice more and the combined n-butanol extracts washed with water (3 x 5 parts). The product is then extracted from the n-butanol with 2 portions of 10 parts of water, to which sufficient sodium bicarbonate is added to raise the aqueous phase to pH 7.0, and isolated therefrom by freezing drying. The sodium salt of 6-(p-nitrobenzenesulfonamido)penicillanic acid is thus obtained.

In like manner the following penicillins are prepared as their sodium salts:

6-(p-bromobenzenesulfonamido)penicillanic acid
6-(2-naphthalenesulfonamido)penicillanic acid
6-(3,4-dichlorobenzenesulfonamido)penicillanic acid
6-(n-butanesulfonamido)penicillanic acid

What is claimed is:
1. O-phenylenedioxymethyl penicillin.
2. 2,3-dimethyl-6-quinoxalylpenicillin.
3. 4-hydroxy-2-quinolylpenicillin.
4. 1,2,3,4-tetrahydro-5-acridylpenicillin.
5. β-(2,5-dimethyloxazolyl-4)ethylpenicillin.

References Cited by the Examiner
UNITED STATES PATENTS

| 2,479,295 | 8/49 | Behrens et al. | 260—239.1 |
| 2,479,296 | 8/49 | Behrens et al. | 260—239.1 |
| 2,479,297 | 8/49 | Behrens et al. | 260—239.1 |
| 2,941,995 | 6/60 | Doyle et al. | 260—239.1 |
| 2,978,447 | 4/61 | Tosoni et al. | 260—239.1 |

FOREIGN PATENTS 569,728  11/58  Belgium.

OTHER REFERENCES

Burger: Medicinal Chemistry, pages 46–48 (1960).
Jour. Amer. Med. Assoc., page 466, May 24, 1958.
Morton: The Chemistry of Heterocyclic Compounds, page VI of the preface (1946).
Mortimer et al.: Jour. Amer. Chem. Soc., vol. 74 pages 4098–4102 (1952).
Wertaeim: Textbook of Organic Chemistry, pages 763–764 (1945).

NICHOLAS S. RIZZO, *Primary Examiner.*
IRVING MARCUS, WALTER A. MODANCE,
*Examiners.*